3,374,197
VINYLIDENE CHLORIDE COPOLYMER COMPOSITION
Richard Jay England, Circleville, Ohio, and Ronald William Skeddle, Clairton, Pa., assignors to E. I. du Pont de Nemours and Company, Wilmington, Del., a corporation of Delaware
No Drawing. Filed Apr. 7, 1965, Ser. No. 446,435
2 Claims. (Cl. 260—29.6)

This invention relates to improved coating compositions and to polyester films coated therewith and more particularly to blends of vinylidene chloride copolymer dispersions and to polyester films coated therewith.

In the development of films for a variety of applications it is found that the requirements for many uses are met in a polyethylene terephthalate film coated with a vinylidene chloride copolymer coating. Such a product finds application in many packaging outlets and as a substrate for laminating to other films such as polyethylene and other film forming materials and coated products. In such applications it is found, however, that there are some shortcomings in the vinylidene chloride copolymer coated products available under present technology. For example, for applications wherein the vinylidene chloride copolymer coated film is to be laminated to other film structures and wherein adhesives and/or primers are to be employed for making such laminations there is experienced, to a considerable degree, a failure in the anchorage properties of the vinylidene chloride coating to the base layer of polyethylene terephthalate as indicated by poor cold peel. Also the solvent resistance of the coated product is in many instances border-line, causing or permitting delamination of final laminar product. In still other instances, it is observed that the barrier characteristics of the vinylidene chloride copolymer coated product are inadequate, presumably because of faulty coalescence of the coating polymer particles. It is also observed that the coated products have a tendency to develop a haziness, termed "flex crazing" which develops when the coated film is subjected to a flexing action.

Attempts have been made to surmount these difficulties through the use of vinylidene chloride copolymer dispersion coatings which are more highly crystalline. In these instances, though grease-proofness and solvent resistance as well as permeability characteristics are improved, there is invariably an accompaniment of poor adhesion or anchorage of the coating to the base layer as the crystallizability of the coating polymer is increased and such films have a narrow heat-sealing temperature range. Attempts to employ an amorphous coating usually leads to an improvement in the adhesion characteristics of the coating and to a broader heat-sealing range for the coated product but in this instance the films are deficient in grease-proofness and in resistance to vapor and solvent penetration.

It is, therefore, an object of this invention to provide a coating composition and polyester films coated therewith which are free from the deficiencies outlined above.

It is a further object of this invention to provide coated polymeric films having a desired balance of required properties such as cold peel and solvent resistance. These and other objects will appear hereinafter.

These and other objects of the invention are accomplished by a coating composition comprising a blend of two aqueous vinylidene chloride copolymer dispersions, each of which is coalescible to a transparent coherent film, a coalesced film formed from the first dispersion having an infrared reflectance ratio within the range of about 1.25 to 1.55 and a coalesced film formed from the second dispersion having an infrared reflectance ratio no greater than 1.15, the coalesced film formed from the blend of dispersions having an infrared reflectance ratio within the range of 1.35 to 1.50, preferably 1.35 to 1.45, the term infrared reflectance ratio being a measure of the degree of crystallinity as determined on a coalesced film of the copolymer dispersion dried and aged for three days at 25° C. The proportion of the copolymer from the first dispersion in the dispersion blend is from about 50% to 75%, preferably 50% to 60%, by weight of the total solids in the blend and the proportion of the copolymer from the second dispersion in the dispersion blend is from about 50% to 25%, preferably 50% to 40%, by weight of the total solids in the blend.

The vinylidene chloride copolymer dispersions useful for the present invention can be prepared by procedures previously described in the art, for example, those described in U.S. Patent 2,828,069—the infrared reflectance ratio being a measure of the degree of crystallinity of the copolymer. In general, the vinylidene chloride copolymer dispersions having a vinylidene chloride content about 92% are highly crystalline. Those having a vinylidene chloride content not greater than about 92% by weight tend to be amorphous.

In the present invention, the copolymer of the first dispersion contains between 92 and 96 parts by weight of vinylidene chloride, between 8 and 4 parts by weight of an alkyl acrylate wherein the alkyl group contains from one to three carbon atoms and between 0.5 and 5 parts by weight of itaconic acid. The copolymer of the second dispersion contains between 80 and 91.5 parts by weight of vinylidene chloride, between 20 and 8.5 parts by weight of acrylonitrile and between 0.5 to 5 parts by weight of itaconic acid.

In order to provide a coating on a polyester film, such as polyethylene terephthalate, which is resistant to solvents and has good cold peel, it is essential that both components of the dispersion blend be coalescible to a transparent coherent coating. Dispersions of crystalline vinylidene chloride copolymer which form a film having an infrared reflectance ratio greater than 1.55 are so highly crystalline that they tend to interfere with coalescence of coatings made from dispersion blends containing the highly crystalline dispersions.

The polyester films are coated with the dispersion blend of this invention by procedures known in the art. A particularly suitable process is that described in U.S. Patent 2,977,243.

A vinylidene chloride/methyl acrylate/itaconic acid (94/6/2) copolymer dispersion (A) of relatively high degree of crystallinity on coalescence and drying is made as follows:

In a reactor fitted with stirrer and condenser and flushed with nitrogen there is placed the following:

Water, 130.0 lbs.
"Duponol" WAQ [1], 4.14 lbs.
Itaconic acid, 2.4 lbs.
Methyl acrylate, 7.2 lbs.
Vinylidene chloride, 112.8 lbs.

[1] Sodium salt of the fatty alcohol sulfate in aqueous solution—53% active ingredient (Du Pont Co.).

The weigh tank is flushed with 40.0 lbs. of water which is added to the ingredients listed above, after which, heating of the reaction mixture is started. When the temperature of the mixture reaches about 29° C., 18.0 grams of ammonium persulfate dissolved in water is added. At a temperature of 30–31° C., 9.0 grams of sodium metal-bisulfite and 0.6 gram of ferrous ammonium sulfate, both dissolved in a small quantity of water are added. Thereafter the loading ports of the reactor are flushed with water (total, including that added with catalyst—11.0 lbs.) and heating is continued.

The condenser of the reactor is left open to the atmosphere for 30 to 45 minutes as the reaction mixture begins to reflux at about 35° C., it is then closed as the exothermic reaction proceeds during which a pressure of about 5 p.s.i.g. develops. When the reaction mixture stops refluxing, indicating completion of polymerization, nitrogen is introduced through the condenser to a pressure of 5 to 10 p.s.i.g. until the mixture begins to cool.

There is then added to the reactor an additional 4.14 lbs. of "Duponol" WAQ mixed with 8.0 lbs. of water. Solids content of the finished dispersion is 42%.

Following substantially the same procedure, a less crystalline vinylidene chloride/acrylonitrile/itaconic acid (90/10/1) copolymer dispersion (B) is made from the following charge to the reactor vessel. Solids content of the finished dispersion is about 40%.

Water, 130.0 lbs.
"Duponol" WAQ, 4.14 lbs.
Itaconic acid, 1.2 lbs.
Acrylonitrile, 12 lbs.
Vinylidene chloride, 108 lbs.

The two dispersions (A and B) are then mechanically mixed in the proportions illustrated in Table I below, the proportions being based on total weight of the dispersions. Following the procedure described in U.S. Patent 2,977,243 they are coated on one surface of base films of polyethylene terephthalate, 0.5-mil thick which had been stretched 3 times its original dimension in two directions and heat set at 200° C. while under tension. The resulting coated films bearing approximately 8 grams of coating per square meter are then tested for resistance to acetone solvent as measured by a Gardner hazemeter, and after aging 3 days at 25° C., for degree of crystallinity as measured by infrared reflectance ratio. Samples of the same films melt coated with a 3-mil thick layer of branched polyethylene resin of density 0.915 to 0.920 are also tested for cold peel adhesion.

TABLE I

| Experiment Number | Dispersion A/ Dispersion B | Infrared Reflectance Ratio | Haze Reading | Cold Peel, gram/inch |
| --- | --- | --- | --- | --- |
| 1 | 0/100 | 0.95 | 550 | 500 |
| 2 | 25/75 | 1.24 | 145 | 450 |
| 3 | 35/65 | 1.26 | 100 | 417 |
| 4 | 50/50 | 1.37 | 32 | 300 |
| 5 | 60/40 | 1.455 | 25 | 93 |
| 6 | 100/0 | 1.545 | 22 | 84 |

It will be noted that poor solvent resistance is obtained, as indicated by high haze readings and illustrated in Experiments 1, 2, and 3, until about a 50/50 mixture of crystalline and amorphous dispersions (Experiment No. 4) is reached. A combination of good solvent resistance (haze value below 35) and good cold peel value is realized also at about the 50/50 ratio of crystalline and amorphous dispersions, although the cold peel values fall rapidly as the proportion of crystalline dispersion is increased much above 50%, but such coated films may be used in applications where cold peel requirements are not too severe.

In attempts to utilize in the mixture of dispersions, a dispersion which was so crystalline that it could not coalesce to a coherent film, the desired combination of high solvent resistance and good cold peel characteristics was not achieved.

*Solvent resistance—Haze*

A 3 x 5 inch film sample is dipped in acetone for five seconds, removed and air dried until free of solvent. Haze is then measured on the sample on a Gardner hazemeter following the general directions of ASTM—F-1003—59T. Generally, a haze reading below about 35 is good.

*Cold peel*

This test is carried out on a sample of polyethylene terephthalate base film bearing a vinylidene chloride copolymer subcoat and a top coating of polyethylene resin. The top coat layer of polyethylene is pried loose from the subcoat layer at one end of a 1½ inch wide strip of test film. The delaminated portions of the top coat and base layer of the sample are respectively clamped to the jaws of a Suter tester or similar tension measuring device and the force required to pull the top coat layer from the base is measured and recorded as grams per width of sample.

*Infrared reflectance ratio*

This is determined on a Perkin-Elmer Double Beam Spectrophotometer, Model 21, fitted with a KRS5 prism (Instrumental Methods of Analysis—Willard, Merrit and Dean—D. Van Nostrand Co., Inc.—third edition—p. 156). The film sample is cut to fit the face of the prism, with the coated surface of the film in contact with the prism face. The instrument is set for maximum sensitivity and for a wave length span from 8 microns to about 12 microns. Partially crystalline vinylidene chloride copolymers have been observed to show two separate absorption maxima in the region of 9.35 to 9.55 microns, the lesser of the maxima at 9.35 microns being attributed to the amorphous regions and the greater maxima at 9.55 microns being attributed to the crystalline regions. A measure of the degree of crystallinity of the sample is reached by determining the ratio of the two maxima. This is done by measuring the difference in heights of the absorption maxima as obtained on a log scale absorbence chart and determining the ratio of the value of the 9.55-micron maximum to that of the 9.35-micron maximum. For these determinations, the film samples are aged for 3 days at 25° C. after preparation.

What is claimed is:

1. Process for preparing a coalescible aqueous coating composition of vinylidine chloride which comprises mixing (1) between about 50% and about 75% by weight of the total solids in said blend a first aqueous vinylidene chloride copolymer dispersion containing between about 92 and about 96 parts by weight of vinylidene chloride, between about 8 and about 4 parts by weight of an alkyl acrylate wherein the alkyl group contains from 1 to 3 carbon atoms and between about 0.5 and about 5 parts by weight of itaconic acid, wherein a coalesced film of said first aqueous dispersion is characterized by an infrared reflectance ratio between about 1.25 and about 1.55 with (2) between about 50% and about 25% by weight based upon the total solids content of said blend of a second aqueous vinylidene chloride copolymer dispersion which contains between about 80 and 91.5 parts by weight of vinylidene chloride, between 20 and 8.5 parts by weight of acrylonitrile and between about 0.5 and about 5 parts by weight of itaconic acid, wherein a coalesced film of said second dispersion is characterized by an infrared reflectance ratio no greater than 1.15, and further wherein the coalesced film of said blend of dispersions is characterized by an infrared reflectance ratio between about 1.35 and about 1.50.

2. A coalescible aqueous coating composition of a blend of vinylidene chloride dispersions which comprises (1) between about 50% and about 75% by weight of the total solids in said blend of a first aqueous vinylidene chloride copolymer dispersion containing between about 92 and about 96 parts by weight of vinylidene chloride, between about 8 and about 4 parts by weight of an alkyl acrylate wherein the alkyl group contains from one to three carbon atoms and between about 0.5 and about 5 parts by weight of itaconic acid, wherein a coalesced film of said first aqueous dispersion is characterized by an infrared reflectance ratio between about 1.25 and about 1.55 and (2) between about 50% and about 25% by weight based upon the total solids content of said blend of a second aqueous vinylidene chloride dispersion which contains between about 80 and 91.5 parts by weight of vinylidene chloride, between 20 and 8.5 parts by weight of acrylonitrile and between about 0.5 and about 5 parts by weight of itaconic acid, wherein a coalesced film of said second dispersion is characterized by an infrared reflectance ratio no greater than 1.15, and further wherein a coalesced film of said blend of dispersions is characterized by an infrared reflectance ratio between about 1.35 and about 1.50.

References Cited

UNITED STATES PATENTS

| | | | |
|---|---|---|---|
| 3,240,742 | 3/1966 | Hahn et al. | 260—899 |
| 3,287,446 | 11/1966 | Koch | 260—898 |
| 2,909,449 | 10/1959 | Banigan | 260—899 |
| 3,108,017 | 10/1963 | Messwarb et al. | 260—899 |

MURRAY TILLMAN, *Primary Examiner.*

SAMUEL H. BLECH, *Examiner.*

J. L. WHITE, *Assistant Examiner.*